United States Patent
Brydon et al.

(10) Patent No.: US 9,325,849 B1
(45) Date of Patent: Apr. 26, 2016

(54) CUSTOMER SERVICE ROUTING

(71) Applicants: Antony Brydon, New York, NY (US);
Jeff Patterson, Pleasant Hill, CA (US);
Jean Tessier, Foster City, CA (US);
Scott Golubock, Morgan Hill, CA (US);
Vlad Georgescu, Brasov (RO); Ruben Kislaki, Reghin (RO)

(72) Inventors: Antony Brydon, New York, NY (US);
Jeff Patterson, Pleasant Hill, CA (US);
Jean Tessier, Foster City, CA (US);
Scott Golubock, Morgan Hill, CA (US);
Vlad Georgescu, Brasov (RO); Ruben Kislaki, Reghin (RO)

(73) Assignee: DIRECTLY, INC., Palo Alto, CA (US)

(*) Notice: Subject to any disclaimer, the term of this patent is extended or adjusted under 35 U.S.C. 154(b) by 0 days.

(21) Appl. No.: 14/619,012

(22) Filed: Feb. 10, 2015

Related U.S. Application Data

(60) Provisional application No. 61/953,665, filed on Mar. 14, 2014, provisional application No. 62/045,520, filed on Sep. 3, 2014.

(51) Int. Cl.
| | |
|---|---|
| *H04M 3/00* | (2006.01) |
| *H04M 5/00* | (2006.01) |
| *H04M 3/523* | (2006.01) |
| *G06F 17/30* | (2006.01) |
| *G06Q 10/06* | (2012.01) |
| *H04M 3/51* | (2006.01) |

(52) U.S. Cl.
CPC ......... *H04M 3/5233* (2013.01); *G06F 17/3053* (2013.01); *G06Q 10/063112* (2013.01); *G06Q 10/063114* (2013.01); *H04M 3/5183* (2013.01)

(58) Field of Classification Search
USPC ...................................... 379/265.12
See application file for complete search history.

(56) References Cited

U.S. PATENT DOCUMENTS

| | | | | |
|---|---|---|---|---|
| 5,946,386 | A * | 8/1999 | Rogers | H04L 29/06 379/265.09 |
| 6,826,194 | B1 * | 11/2004 | Vered | H04M 3/5191 370/449 |
| 7,372,952 | B1 * | 5/2008 | Wu | H04M 3/5233 370/352 |
| 7,796,747 | B1 * | 9/2010 | McCormack | H04M 3/5233 379/203.01 |
| 2004/0111310 | A1 * | 6/2004 | Szlam | G06Q 10/10 705/317 |
| 2005/0002502 | A1 * | 1/2005 | Cloran | G06Q 10/06311 379/88.18 |
| 2006/0153356 | A1 * | 7/2006 | Sisselman | H04M 3/5233 379/265.12 |
| 2010/0287050 | A1 * | 11/2010 | Jones | G06Q 30/02 705/14.58 |

* cited by examiner

*Primary Examiner* — Quynh Nguyen
(74) *Attorney, Agent, or Firm* — Peters Verny, LLP

(57) ABSTRACT

In a crowd sourcing approach, responses to customer service inquiries are provided by providing the inquiries to an independent group of experts. These experts are typically able to resolve the inquiry before the inquiries are routed to a traditional contact center. The customer service inquiries are routed to specific experts based on matches between identified subject matter of the inquiries and expertise of the experts. In some embodiments, more than one expert can contribute to the resolution of an inquiry.

27 Claims, 1 Drawing Sheet

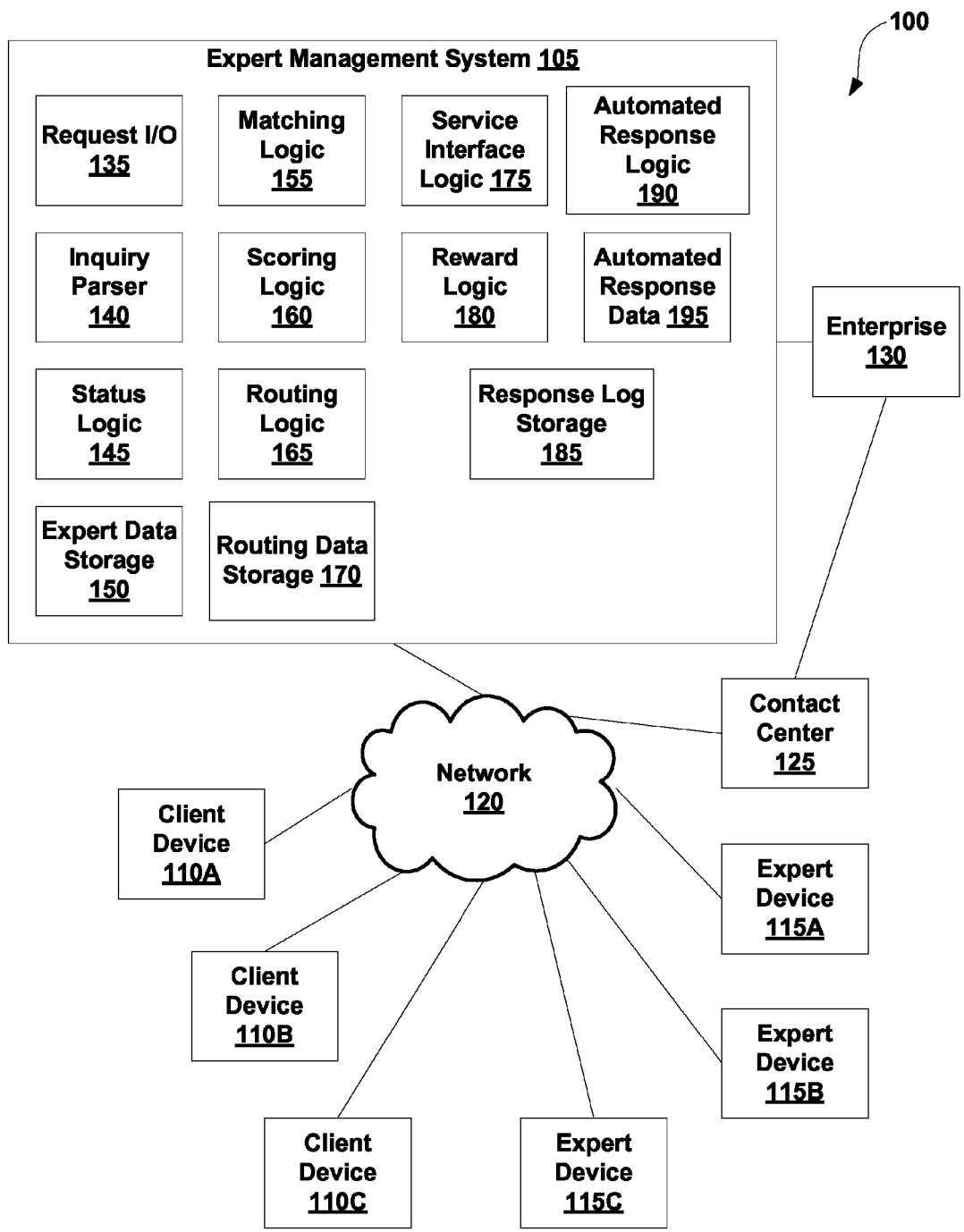

CUSTOMER SERVICE ROUTING

CROSS-REFERENCE TO RELATED APPLICATIONS

This application claims benefit and priority to U.S. provisional patent application Ser. No. 61/953,665 filed Mar. 14, 2014 and U.S. provisional patent application Ser. No. 62/045,520 filed Sep. 3, 2014. The contents of the above provisional patent applications are hereby incorporated herein by reference.

BACKGROUND

1. Field of the Invention

The invention is in the field enterprise information management, and more specifically in the field of routing and managing customer service inquiries.

2. Related Art

Typical customer service systems include a contact center configured to communicate with customers by voice, chat, video, text or e-mail. These systems often include a series of questions that are presented to a customer and configured to identify the customer's needs. For example, a customer calling to a contact center may be asked to enter numbers on their phone to route the call to a specific group of service personnel. The customer is typically placed in a queue and then transferred to the next available service person. Such contact centers are expensive to establish and maintain.

SUMMARY

Some embodiments of the current invention include systems and methods of providing improved customer service. These improved services are achieved by processing and potentially resolving customer service inquiries prior to routing these inquiries to a contact center. The processing includes presenting the customer service inquiries to one or more "experts." These experts may be independent persons having experience or qualifications in the subject of the customer service inquiry. Optionally, customer service inquiries that are not resolved by an expert are eventually forwarded to an enterprise contact center.

Experts are managed by computing systems configured to determine which expert should receive a particular customer service inquiry, to determine which experts are currently available, manage rewards, and/or to generate expert scores. Customer service inquiries are routed by the computing systems to establish communication channels between the expert and source of the service inquiry. These computing systems are thus configured via specific computing instructions to produce a specific purpose computing system.

Various embodiments include an expert management system configured to manage customer service inquiries, the system comprising a request I/O configured to receive a customer service inquiry; an inquiry parser configured to determine one or more topic characteristics of the inquiry; status logic configured to monitor statuses of a plurality of experts; expert data storage configured to store data characterizing one or more specialty characteristics of each of the plurality of experts; routing data storage configured to store logs of inquiry routing; matching logic configured to match the inquiry to a first human expert of the plurality of human experts, the matching being based on the one or more expert score of the first human expert and a correlation between the topic characteristics of the inquiry and the specialty characteristics of the first human expert; scoring logic configured to generate the one or more expert score based on response ratings of responses provided by the first human expert; and routing logic configured to route the inquiry to the first human expert. The expert management system optionally further includes service interface logic configured for the first human expert to communicate with a source of the customer service inquiry; automated response logic configured to generate an automated response to the inquiry, the automated response being based on the topic characteristics of the inquiry and including a pre-determined answer to the inquiry; reward logic configured to provide a reward to the first human expert as consideration for providing an answer to the customer service inquiry; and/or response log storage configured to store responses to the customer service inquiry, the stored responses being accessible to the plurality of human experts.

BRIEF DESCRIPTION OF THE DRAWINGS

FIG. 1 illustrates a customer service architecture, according to various embodiments of the invention.

DETAILED DESCRIPTION

The systems and methods described herein are directed toward the resolution of customer service inquiries. For example, they may be used to resolve a customer service inquiry received from a customer or prospective customer ("a requester"). The inquiries are resolved by first routing the inquiries to an expert management system and then, if needed, the inquiries are routed to a contact center. The routing is based on a rule set that is configured to reduce the number of inquiries received by the contact center while, at the same time, assuring minimum levels of response quality, response time, and/or customer satisfaction. Typically, resolving inquiries using the expert management system is more cost effective than having the inquiries resolved by the contact center.

While a contact center is typically managed or under contract with a specific enterprise, experts managed by the expert management system can be independent persons having expertise in one or more topics. For example, an expert in a cellular telephone service may be an experienced user or a current/former employee of a telephone company. The plurality of experts forms a support and/or service community having a diverse range of expertise. Communication with experts may be via the internet. For example, an expert may provide customer service via a personal computer, tablet computer, or cellular telephone. Communication between a requester and an expert can be via telephone, voice over Internet Protocol (VoIP), text session, video, e-mail, chat, Facetime®, mobile application, etc.

In various embodiments, experts managed by the expert management system are provided by a third party enterprise that qualifies or certifies the experts. For example they may be contractors, certified customers, non-support employees, retirees, etc. These experts are optionally part of an enterprise social network, e.g., a social network that is based at least in part on the members or structure of an enterprise on behalf of whom the service is provided. For example, the experts managed by the expert management system may be members of an enterprise social network consisting of current employees, retirees and/or qualified customers.

Experts may be compensated via a variety of methods. In some embodiments a person making the inquiry for service posts a reward. In some embodiments a tip is paid to the expert by the person making the inquiry after an answer is provided. In some embodiments an enterprise pays or provides funds for paying experts to resolve service inquiries, optionally before the inquiries reach a contact center. For example, a utility company may designate funds to be paid to experts that prevent calls from reaching the utility company's contact center.

In some embodiments, the expert management system is configured to manage experts in response to the real-time demand at a contact center. For example, the expert management system may be configured to route inquiries to experts in response to a wait time at a traditional contact center. In some embodiments the expert management system and a contact center are managed such that the cost of the contact center can be reduced because inquiries are routed to experts at times of highest demand. Other factors that may be considered in routing inquiries to experts include: a customer profile, time of day, question type, service (e.g., knowledge) center availability, location of the requester, keywords, an opt-in/opt-out status, information known about the requester, and/or any other information pertaining to the inquiry and/or parties involved.

Certain terms are defined herein to have specific meanings. As these terms are used herein in the specification and claims, these terms are meant to be inherently limited by the definitions provided. Specifically, as used herein:

A "customer service inquiry" is defined as a request for help, assistance, support or some other type of service. Customer service inquiries can include technical service, sales service, advice, reviews, geographic directions, assembly directions, customer service and/or the like. Customer service inquiries may originate from an individual or a business that wishes to know about, consumes or potentially consumes a product or service. Customer service inquiries are sometimes referred to herein as "service inquiries" or simply "inquiries" where the context is clearly referring to customer service inquiries. Inquiries may be requests for services or information.

A "requester" is a person or enterprise that submits a customer service inquiry using a communication device.

An "expert" is defined as a person that makes him or herself available to provide responses (e.g., answers) to customer service inquiries. Experts can have different specialty characteristics, which denote topics in which the expert has expertise. In some embodiments, experts may have different levels of certification. For example, a "certified expert" may be one that is acknowledged by an enterprise to have specialty characteristics in the activities of that enterprise. In one embodiment, an airline certifies outside experts as having specialty characteristics in the airline's reservation system. A certified expert may be certified on the basis of having passed a test such as a language test or a technical skill test, and/or on the basis of having completed specific training. These experts may be former employees of the airline and/or have been trained by the airline. An official expert is an enterprise employee or some other person that is provided with access to customer and/or account information that is generally not public. For example, if an enterprise is a bank, then an official expert may be a contractor to whom the bank has given access to selected customer account information.

A "contact center" is defined as a facility populated by service personnel consisting of employees of an enterprise or employees of contractors to the enterprise for the purpose of responding to customer service inquiries. Contact centers may support one or more specific enterprise and normally have a set number of service personnel available to answer service inquiries at any given time. Contact centers may communicate with requesters by phone, chat, text and/or e-mail. The service personnel of a contact center are directly or indirectly under the control of an enterprise that pays for the service personnel to answer service inquiries and control the contents of the answers provided. One example of a contact center is a traditional call center.

An "enterprise" is defined as a business or other organization that would normally receive customer service inquiries relating to products or services of the enterprise. Examples of enterprises include corporations, product and service companies, professional organizations, political organizations, unions, non-profits, and/or academic or scientific institutions. Enterprises may have their own contact centers or may contract contact center services from third parties. In either case, the enterprises typically have control over the activities over contact center personnel. For example, the Enterprise will define answers to be given to specific questions.

An "answer" is the content of a response to a customer service inquiry and is intended to resolve the inquiry, ask for explanation or further details of the inquiry, and/or provider the requester with options relating to resolution of the inquiry.

FIG. 1 illustrates a Customer Service Architecture 100, according to various embodiments of the invention. Customer Service Architecture 100 includes an Expert Management System 105 configured to communicate with a plurality of Client Devices 110 and a plurality of Expert Devices 115 via a Network 120. Client Devices 110 and Expert Devices 115 are individually references as A, B, C, etc. The numbers of Client Devices 110 and Expert Devices 115 illustrated in FIG. 1 are for illustrative purposes; typically Customer Service Architecture 100 is configured to service much larger numbers of Client Devices 110 and Expert Devices 115. Expert Management System 105 is optionally further configured to communicate with a Contact Center 125 and/or an Enterprise 130. These communications are optionally via Network 120.

Client Devices 110 are the communication devices of a person sending a customer service inquiry. These communication devices can include, for example, a personal computer, a telephone, a cellular telephone, a tablet computer, a vending device, an interactive advertisement, a terminal, a point of sale system, a kiosk, and/or the like. Client Devices 110 enable communication modes such as voice, text, e-mail, video, MMS (multi-media messaging), and/or the like. Client Devices 110 are optionally configured to communicate through a web browser. Client Devices 110 optionally include an application specifically configured for communicating with Expert Management System 105.

Expert Devices 115 are the communication devices of experts. Expert Devices 115 can include the same types of devices as discussed herein with respect to Client Devices 110. In some embodiments, an expert may have a plurality of different devices the expert uses to response to customer service inquiries. For example, one expert may use a personal computer, a tablet computer and a cellular phone to communicate with Clients 110 and/or Expert Management System 105. Expert Devices 115 optionally use a browser or custom application for this communication.

Network 120 is a communication network such as the internet, a wide area network, a cellular network, a telephone network (POTS), a satellite network, a cable network, and/or the like. Network 120 may include wired and wireless segments.

Expert Management System 105 includes a Request I/O 135 configured to receive customer service inquiries and communicate with Client Devices 110 and Expert Devices 115. Request I/O 135 may include a plurality of different devices, such as routers, firewalls, Ethernet ports, gatekeepers, switches, and/or the like. Request I/O 135 is configured to communicate via Network 120 and is typically configured to communicate via TCP/IP protocols. Request I/O 135 is optionally configured to communicate over a secure (e.g., encrypted) communication channel.

Expert Management System 105 further includes an Inquiry Parser 140 configured to parse received customer service inquiries. Inquiry Parser 140 includes computer implemented logic configured to automatically parse each customer service inquiry and determine one or more topic characteristics of the inquiry, without human analysis. Inquiry Parser 140 includes hardware, firmware and/or software stored on a non-transient computer readable medium. Topic characteristics are characteristics of the service inquiry that are indicative of the topic(s) of the service inquiry. For example, topic characteristics may include information regarding a source of the service inquiry, metadata characterizing text within the service inquiry, account information, keywords within the service inquiry, and/or the like. Examples of topic characteristics include questions regarding specific software or hardware, business services, reservations, bill payment, account services, how to do something, medical questions, installation procedures, advice, appointments, professional recommendations, etc.

In some embodiments, Inquiry Parser 140 is configured to identify a source of the customer service inquiry and to infer topic characteristics of the service inquiry based on the identity of the source. For example, if a service inquiry arises from a member of Client Devices 110 that includes a kiosk in a retail store of a cellular telephone company, then Inquiry Parser 140 can infer that the topic of the customer service inquiry is related to the cellular telephone company. In another example, if the customer service inquiry is received from a webpage hosted by an electronics retailer, then Inquiry Parser 140 can infer that the topic of the customer service inquiry is related to the products of the electronics retailer, or to a specific product displayed on the webpage. In some embodiments, Inquiry Parser 140 is configured to use a location of a member of Client Devices 110 as a topic characteristic. For example, if the customer service inquiry is received from Client Device 110A while Client Device 110A is located at a national park, then Inquiry Parser 140 can infer that the topic of the inquiry related to that park. Inquiry Parser 140 is optionally configured to use a universal resource locator (URL), internet domain, account, browser type, application type, and/or similar information regarding the customer service inquiry. For example, Inquiry Parser 140 may use the identity of a web page or mobile application from which a customer service inquiry was received to select a natural language processing lexicon to be used in identifying topic characteristics of the inquiry.

Inquiry Parser 140 optionally includes a natural language processing engine to determine one or more topic characteristics of a customer service inquiry. A lexicon used by the natural language processing engine may be selected based on a source of the customer service inquiry. The natural language processing engine is optionally configured to detect and interpret phrases as well as key words and phrases that pertain to the industry (i.e., "wireless"), company (i.e., "Verizon"), location (i.e., "California"), topic (i.e., "Downloading music"), device (i.e., "iPhone"), etc.

In some embodiments, Inquiry Parser 140 is configured to identify metadata within a customer service inquiry and to assign particular meaning to data tagged by the metadata. For example, if the customer service inquiry is generated in Client Device 110B using a browser, the inquiry may include data entered in specific fields of a webpage configured to receive keywords such as model number, brands, serial numbers, topic identifiers, account numbers, login, etc. The inquiry may include data characterizing a customer profile, a device type of Client Device 110B, a browser identity, an operating system identity, a source Universal Resource Locator (URL), a source Internet Protocol (IP) address, a source MAC address, a security token or certificate, and/or the like.

Expert Management System 105 further includes Status Logic 145 configured to monitor the status of a plurality of experts. Status Logic 145 includes hardware, firmware and/or software stored on a non-transient computer readable medium. The status of an expert can include one or more expert score as well as a classification such as "busy," "available," "unavailable," "standby," "offline," etc. An expert's status can be a function of real-time factors (is the expert immediately available to respond to a customer service inquiry) and cumulative factors (is the expert in a probationary period). An expert's status may change on a short term time scale. For example, if an expert is available and then start responding to a support inquiry and then finishes the response, then their status may change from available to busy and back to available in less than a minute. In some embodiments, Status Logic 145 is configured to automatically scale capacity to respond to customer service inquiries. For example, Status Logic 145 may be configured to automatically bring additional experts online by contacting them via telephone, text message or e-mail, when these additional experts are needed. Status Logic 145 is optionally configured to target experts having specific expertise or qualifications when scaling capacity.

The availability of an expert can include a variety of factors such as an expert reputation, expert score, expert knowledge, expert skill tags, expert presence (whether the expert is currently logged into Expert Management System 105), if of the expert, where the expert is currently responding to a customer service inquiry, a location of the expert, a language of the expert, an availability schedule, and/or the like. In some embodiments, availability is predicted and/or based on an activity pattern. For example, an expert may be known to be most responsive on Sundays but not to be responsive at night. Several of these factors are determined by communications between Expert Management System 105 and Expert Devices 115. Each of Expert Devices 115 is typically associated with particular expert. This association is established by a login or registration process.

Status Logic 145 is optionally configured to communicate regularly (e.g., ping or toll) with Expert Devices 115 in order to determine some of the factors associated with expert status. For example, Status Logic 145 may periodically determine if a communication channel is open to an expert's cellular phone, if a specific browser window is open on an expert's computing device, and/or if an expert has finished responding to a customer service inquiry.

Status Logic 145 is optionally configured to monitor communications between members of Expert Devices 115 and members of Client Devices 110. Based on this monitoring Status Logic 145 can determine when an expert has started and/or is finished responding to a customer service inquiry, how many customer service inquiries an expert is servicing at a particular time, how long an expert takes to resolve a customer service inquiry, how long the resolution of a customer service inquiry has taken, how many messages have been exchanged for the resolution of a customer service inquiry, and/or the like. In some embodiments, an expert may be assigned to resolve more than one customer service inquiry at a time. The number of inquiries that an expert may be assigned at the same time is optionally a function of a score and/or classification of the expert. Status Logic 145 may consider an expert to be available when the expert is responding to less than an allowed number of simultaneous service inquiries for that expert.

In some embodiments, one or more experts are not specifically assigned to an inquiry. For example, in these embodiments, multiple available experts may be notified of a service inquiry in parallel. Optionally, when one of these experts starts a response to the inquiry the others are notified. The response of one expert may be viewed by the other experts that were notified. The other experts may then rate the response and/or edit the response. A response that is added to, or otherwise modified by another expert is referred to herein as a "collaborative" response. Experts that contribute to a collaborative response optionally divide rewards. In an illustrative method, 5 experts are notified of a service inquiry and all five have an opportunity to be the first to start responding. A response provided by one of the experts is optionally displayed to the other experts in real-time, e.g., character by character, word by word, or line by line. More than one expert may provide responses to a service inquiry. These responses may be coordinated or independent. Experts optionally receive suggestions to answer specific aspects of a service inquiry. For example, a hardware expert may receive a suggestion to address a hardware aspect of a computer problem while an application expert may receive a suggestion to address part of the inquiry related to the (software) application.

The value of reward paid to an expert responding to a customer service inquiry can be set by Expert Management System 105 based on a score of the expert, a fee demanded by the expert, a rate paid the expert, a classification of the expert, a difficulty in resolving a specific customer service inquiry, enterprise identity, question type, customer profile, keyword, time since an inquiry was initially made, and/or the like. The cost of an expert can determine the availability of the expert when there is a limited budget for resolving the inquiry. For example, a budget for resolving inquiries may be set by the requester or by a third party enterprise. If the cost of the expert is greater than allowed for by the budget, then the expert may be considered unavailable with regards to that particular customer service inquiry. If a person or enterprise making the customer service inquiry posts a $5 reward for resolving the customer service inquiry, then experts requiring a reward of $10 would be considered unavailable. The requester is optionally informed that a higher reward would make additional experts available.

The location of an expert may be considered in determining if an expert is available to respond to a specific inquiry, when a specific location facilitates responding to the inquiry. For example, if a customer wishes advice on places to visit within a city the inquiry may specify an expert local to the city. The language of an expert may be considered in determining if an expert is available to respond to a specific inquiry. For example, an inquiry may require communication in a specific language or translation between languages.

In some embodiments, Expert Management System 105 is configured to receive and store an availability schedule from an expert. The availability schedule includes time during which the expert is available, unavailable and/or on standby. The condition of standby indicates that the expert is not currently available but could become available upon request. For example, an expert may be may be moved from a standby state to an available state in response to real-time demand. The change in state optionally includes sending a message to a device of the expert, e.g., Expert Device 115A, asking that the expert make ready to respond to inquiries in real-time. As demand changes, the expert may be placed back on standby. Such changes are may be on a relatively short time scale, e.g., less than 10, 30 or 60 minutes, and are optionally not associated with a traditional multi-hour work shift. This allows the system to respond to changes in demand in real-time. In one illustrative example, an airline stewardess trained in reservations may be moved from a standby to an available status for a short time between flights, in response to a high demand. Moving from standby to active optionally includes moving the expert from a queue of experts on standby.

In typical embodiments, an expert is assigned one or more scores. Expert scores are based on one or more of the following: a) time taken to provide an initial response to customer service inquiries, b) time taken to resolve customer service inquiries, c) feedback from requesters of customer service inquiries, d) ratings by fellow experts, and e) cooperation with fellow experts. For example, in some embodiments, a person making a customer service inquiry is asked to rate the quality of the response received from a particular expert. The quality can include factors such as speed of response, helpfulness, etc. In some embodiments, a fraction of responses to customer service inquiries made by an expert are sent to fellow experts for their review of the quality of the responses. The score of an expert can be based on both requester and fellow expert ratings.

Cooperation with fellow experts includes working with fellow experts to respond to a customer service inquiry, and referring customer service inquiries to other experts. A single customer service inquiry may be resolved by more than one expert in cooperation. For example, a problem involving a computer and a software application may be cooperatively solved by an expert having expertise on the computer and an expert having expertise on the software application. A first expert may refer a customer service inquiry to a second expert if the inquiry would be better resolved by the second expert. For example, if a first expert on airline reservations receives a customer service inquiry that would be better handled by a second expert on frequent flyer programs, then the first expert may forward the inquiry to the second expert. If, as optionally determined by the second expert, the forwarding was appropriate, the first expert may be rewarded by an improvement in expert score.

An expert score may include a general component and a component that is specific to different topics. Thus, and expert might have a better score in one topic relative to another topic. An expert may have a high score in motorcycle maintenance and a low score in computer networking.

Expert Management System 105 further includes Expert Data Storage 150. Expert Data Storage 150 includes non-transitory memory specifically configured to store information relating to experts. The memory is thus configured via data and file structures. For example, Expert Data Storage 150 can include an expert relational database in which data structures are defined to store expert data. The stored expert data includes information such as name, bio, skill sets, one or more specialty characteristics of each expert, expert scores, monitory rewards earned by an expert, records of responses provided in response to customer service inquiries, expert contact information, results of tests taken by an expert, membership in an enterprise social network, expert status, Expert Devices 115 associated with each expert, expert certification, expert qualifications and official designations, expert resumes, expert reward accounts, expert "LinkedIn" pages, expert addresses (IP, e-mail, mailing, phone), and/or the like.

Expert Management System 105 further includes Matching Logic 155 configured to match customer service inquiries to human experts. The matching is based on at least a score of one of the human experts and a correlation between the topic characteristics of the inquiry (e.g., as determined by Inquiry Parser 140) and the specialty characteristics of the human expert. The expert score considered in matching is optionally specific to the topic characteristics of the inquiry. Expert Management System 105 is optionally further configured to match inquiries and experts based on the availability of the experts. For example, if a customer service inquiry is to be resolved in real-time, then only those experts currently available are considered for matching.

Matching Logic 155 is optionally configured to match a plurality of experts to a customer service inquiry. These experts may be ranked, for example, in order from best match to less favorable match. As is described further elsewhere herein, the customer service inquiry may be initially offered to the first ranked expert, and if not resolved later offered to a second ranked expert. In some embodiments, a requester can choose between two or more matched experts, or can select a plurality of experts to answer an inquiry in parallel.

Matching Logic 155 is optionally configured to match a customer service inquiry to a plurality of experts that are part of a group, team or team of experts. For example, a two or more experts having complementary specialty characteristics may establish a team to respond to customer service inquiries jointly. The specialty characteristics of the team and a team score can be considered in the matching of a customer service inquiry to the group. The score of the team is optionally based on the same factors as individual expert scores, as discussed elsewhere herein. Teams may have a better chance of being matched to customer service inquiries because the specialty characteristics of a team are typically more diverse than the individual team members. Complementary specialty characteristics are specialty characteristics that are different but related. For example, a specialty characteristic in Microsoft windows drivers may be complementary to a specialty characteristic in printer installation. Complementary specialty characteristic may be synergistic.

In various embodiments, Matching Logic 155 is configured to match the inquiry based on an inquiry for a specific human expert (e.g., an expert used by the requester in the past), to match based on a topic characteristic identified by a second human expert, and/or to match based on a referral by a second human expert. In some embodiments, Matching Logic 155 is configured to match the customer service inquiry to a second human expert based on an unsatisfactory answer received from the first human expert. In some embodiments, Matching Logic 155 is configured to match the inquiry to official or certified experts from different third parties in parallel (e.g., based on two or more different topics characteristics of the customer service inquiry matching complementary specialty characteristics of the experts).

Expert Management System 105 further includes Scoring Logic 160 configured to calculate expert scores and to associate these scores with the corresponding experts. As discussed elsewhere herein, scores are based on the historical performance of an expert. Typically, the data used to calculate the score for an expert include both feedback from other experts and feedback from customers whose customer service inquiries have been handled by the expert. Scores may be specific to specific topics. As such one expert may have several different expert scores for different topics (specialty characteristics). Scores are optionally further calculated based on certification and/or official status of an expert. In some embodiments, Scoring Logic 160 is configured to calculate scores for groups of experts, such as expert teams.

Expert Management System 105 further includes Routing Logic 165 configured to route customer service inquiries to experts matched to the inquiries by Matching Logic 155. In some embodiments, Routing Logic 165 is configured to route the customer service inquiry to one of Expert Devices 115 and then further communication related to resolution of the inquiry occurs directly between the one of Expert Devices 115 and the originating member of Client Devices 105 (e.g., the member of Client Devices from which the inquiry originated). In some embodiments, Routing Logic 165 is configured to route the customer service inquiry to one of Expert Devices 155 and then route a response from the one of Expert Devices 115 back to the originating member of Client Devices 105. In these embodiments, Routing Logic 165 may route multiple communications between these devices to resolve a customer service inquiry.

Routing Logic 165 uses data stored in Expert Data Storage 150 to route the inquiry. For example, telephone numbers, e-mail and/or or internet protocol (IP) addresses of Expert Devices 115 may be used to address delivery of inquiries. Similar data may be used to route answers back to an originating member of Client Devices 105. Routing Logic 165 is optionally configured to deliver correspondence between experts and requesters to one or more web pages and/or application on which the correspondence can be displayed chronologically as a conversation.

In various embodiments, Routing Logic 165 is configured to route customer service inquiries to more than one expert (associated with more than one of Expert Devices 115). This can occur in various ways. For example, a customer service inquiry may be routed to different experts in a serial manner if a first expert, or set of experts, is unable to provide a satisfactory resolution for a customer service inquiry. The lack of a satisfactory resolution may be determined by the originator of the inquiry (requester) and/or by an elapsed time. A customer service inquiry may be routed to different experts in a serial manner if a first expert (or set of experts) refers the inquiry to a second expert. The second expert may take over responsibility for resolving the inquiry alone, or may work with the first expert to jointly resolve the inquiry. In one example, a response(s) produced by one set of experts may be given to a second set of experts for rating or to provide further input. Optionally, separate responses to an inquiry are provided by different sets (e.g., teams or groups) of experts.

In various embodiments, Routing Logic 165 is configured to route a customer service inquiry to more than one expert in parallel. As used herein, "parallel" routing means that the customer service inquiry is sent to a second expert without regard to whether a response (to the same inquiry) has been received from a first expert. This approach is optionally used to assure that at least one expert responds to the inquiry in a timely manner. For example, a customer service inquiry may be routed in parallel to several different experts identified by Matching Logic 155. The expert that responds first to the inquiry is then optionally assigned responsibility for responding to the inquiry, and the opportunity to respond to the inquiry is then typically withdrawn from other experts. In some embodiments, multiple customer service inquiries are sent to one expert and the expert has the opportunity to select which one he or she is best suited to respond to. In some embodiments, an inquiry is presented to multiple experts in parallel and one or more of these experts can respond to the inquiry. The multiple experts may be notified of more than one inquiry in parallel and each of the experts can then choose which one (or more) of the inquiries to respond to.

Routing Logic 165 is optionally configured to route customer service inquiries to Contact Center 125. This can occur, for example, if an expert refers the service inquiry to Contact Center 125, if an expert is unable to resolve an inquiry to a requester's satisfaction, if an inquiry is not resolved within a predetermined time period, if no expert having needed specialty characteristics is available, if topic characteristics of the inquiry require confidential account data not available to experts, and/or the like. In some embodiments, Routing Logic 165 is configured to route a customer service inquiry to Contact Center 125 if Enterprise 130 reports that there are currently unused service personnel at Contact Center 125. For example, if Enterprise 130 has an instance of Contact Center 125 including 30 service personnel that represent a sunk cost, then Enterprise 130 may wish to use these personnel rather than pay a cost of having the customer service inquiry sent to one of Expert Devices 115. Likewise, Routing Logic 165 may be configured to avoid routing customer service inquiries to Contact Center 125 at time that Enterprise 130 reports that no contact center service personnel are available.

In some embodiments, the ability of an expert to resolve a customer service inquiry can be determined by the requester and/or the expert. A requester may indicate that he or she is unsatisfied with a response provided by an expert and ask that the customer service inquiry be forwarded to Contact Center 125. An expert may determine that he or she is unable to properly respond to a customer service inquiry. The inability to properly respond may be, for example, because the inquiry has been improperly or incompletely characterized by Inquiry Parser 140, because the expert is not qualified, because confidential information (e.g., account access) is required, and/or because there is no resolution to the inquiry. In various embodiments, if an expert is unable to respond to an inquiry the requester may forward the inquiry to Contact Center 125 and/or to another requester.

Expert Management System 105 further includes a Routing Data Storage 170 configured to store logs of inquiry routing. Routing Data Storage 170 includes non-transitory memory specifically configured to store information relating to current and/or past routing. The memory is thus configured via data and file structures. For example, Routing Data Storage 170 can include an expert relational database in which data structures are defined to store routing data. The stored routing data includes information such as which Expert Devices 115 received customer service inquiries from which Client Devices 110, how many inquiries were routed, the source and destination of any answers to these inquiries, how many answers were routed, which experts forwarded inquiries, where the inquiries were forwarded to, and/or the like. In some embodiments, routing data storage is configured to store logs of customer service inquiries that were routed to more than one human expert (in parallel and/or serially) and/or inquiries that were routed to Contact Center 125.

Some embodiments of Expert Management System 105 include Service Interface Logic 175. Service Interface Logic 175 is configured to provide an interface to Expert Devices 115 and/or Client Devices 110 such that requesters and experts can communicate with each other. For example, Service Interface Logic 175 may be configured to generate a webpage including chat and/or video communication objects. All or part of Service Interface Logic 175 may be disposed on Client Devices 110 and/or Expert Devices 115. Service Interface Logic 175 may include a specific application configured to run on Client Devices 110 and/or Expert Devices 115. In some embodiments, Service Interface Logic 175 is configured to support an interactive exchange between Client Devices 110 and Expert Devices 115. This exchange can include multi-step, collaborative and/or parallel answers optionally provided by multiple experts. In various embodiments, Service Interface Logic 175 is configured to refer a requester to an e-commerce site, and/or provide an advertisement based on the content of a customer service inquiry. For example, Service Interface Logic 175 may use the topic characteristics identified in a customer service inquiry to select an advertisement to be displayed at the source of the customer service inquiry (e.g., Client Device 110A). Service Interface Logic 175 is optionally configured to select an advertisement to be displayed at the source of the customer service inquiry, based on a location of the source of the customer service inquiry.

Service Interface Logic 175 is configured to facilitate communication between an expert and Client Devices 110, and to facilitate communication between a requester and Expert Devices 115. In some embodiments, Service Interface Logic 175 includes an object or link configured to be embedded in a web page controlled by Enterprise 130, e.g., a corporate website. For example, Enterprise 130 may have a website and may include a "help inquiry" object in a webpage. This object is generated by and/or part of Service Interface Logic 175.

In some embodiments Service Interface Logic 175 includes features configured for a requester to request that a specific expert respond to a customer service inquiry. These features include logic configured to produce data entry fields, lists of potential experts, a history of experts previously contacted, abstracts of experts, and/or the like. For example, Service Interface Logic 175 is configured to present to a requester a list of experts searchable by expert score, specialty characteristics and/or availability. Service Interface Logic 175 is optionally configured to list experts that have assisted the requester in the past and allow the requester to reengage with these experts. In this way a requester can work with the same expert in several sessions over time. Abstracts of experts may include there scores, experience, qualifications, education, location, LinkedIn® profile, etc.

In some embodiments Service Interface Logic 175 includes features configured to a requester to communicate with several experts at once in response to a single customer service inquiry. For example, Service Interface Logic 175 may be configured to display a multi-party chat window on Client Devices 110, the chat window being configured to receive text, audio and/or video from more than one of Expert Devices 115 in parallel. In these embodiments, a requester may receive service from more than one expert at the same time. The experts may have complementary specialty characteristics, as discussed elsewhere herein.

In some embodiments Service Interface Logic 175 includes features configured for a requester (and/or an enterprise) to post a reward for an adequate response to a customer service inquiry. For example, a requester may post a service inquiry and specify a $10 reward for a response that solves a problem. This reward, or a fraction thereof, is paid to the one or more experts that provide the resolution. Service Interface Logic 175 may also be configured to provide objects with which a requester can pay a tip to an expert.

In some embodiments Service Interface Logic 175 includes features configured for an expert to forward a customer service inquiry and/or manually update topic characteristics of the inquiry. For example, an expert may determine that a customer service inquiry was not properly characterized by Inquiry Parser 140 and, in response, manually provide additional and/or alternative topic characteristics. These provided topic characteristics may then be used to forward or reroute the customer service inquiry. In some embodiments Service Interface Logic 175 includes features configured for an expert to respond to more than one customer service inquiry, from different requesters, in parallel. In some embodiments Service Interface Logic 175 includes features configured for an expert and a requester of a customer service inquiry to communicate directly via Network 120, rather than always through Expert Management System 105.

In some embodiments, Service Interface Logic 175 includes features configured for a requester to rate the satisfaction to which a customer service inquiry was resolved. This rating may include multiple factors such as technical quality, clarity, timeliness, completeness, etc. In some embodiments Service Interface Logic 175 includes features configured for a first expert to rate, modify or add to a response to a customer service inquiry, the response having been made by a second expert or group of experts. As discussed herein ratings made by requesters and/or experts are used to calculate expert scores.

In some embodiments, Expert Management System 105 further comprises Reward Logic 180 configured to provide a reward an expert as consideration for providing one or more answers to a customer service inquiry. This reward is optionally a monetary reward and may be in a virtual currency. The reward is typically paid to an account of an expert. In some embodiments, the reward is specified by Enterprise 130. For example, Enterprise 130 may provide a predetermined monetary reward for each customer service inquiry resolved by experts via Expert Management System 105. Enterprise 130 may specify a budget for resolving customer service inquiry and Reward Logic 180 may be configured to provide rewards to experts based on this budget. The amounts of rewards received by experts is optionally dependent on the rating of the response by the requester and/or other experts, dependent on the topic characteristics of the inquiry, on the amount of time and/or number of experts that contributed to the response, on the score of the expert, on the response time of the expert, on whether the customer service was forwarded (and whom it was forwarded to), on contact center capacity and utilization, on time of day, on time of year, etc. In some embodiments, Reward Logic 180 is configured to split rewards between collaborating experts. An expert may share in a reward as a result of a referral and/or collaboration.

In some embodiments, Reward Logic 180 is configured to provide a reward specified by the source of a customer service inquiry. For example, a requester may designate a reward amount prior to the inquiry being routed to an expert or may designate, after the inquiry is resolved, a reward (tip) to be paid to the expert that resolved the inquiry by providing a satisfactory answer. In some embodiments, experts can bid to receive customer service inquiries, the result of the bidding being based on the lowest bid and/or the experts' scores. For example, the expert willing to be paid the lowest amount (as normalized by expert score) to resolve the inquiry is considered the bidding winner. The winner of the bidding, as determined by Reward Logic 180, receives the customer service inquiry.

In some embodiments, Expert Management System 105 further comprises a Response Log Storage 185. Response Log Storage 185 includes non-transitory memory specifically configured to store responses to customer service inquiries, including responses provided by experts. The memory is thus configured via data and file structures. For example, Expert Data Storage 150 can include a relational database including data records configured to store responses in a chronological order. The data records may be configured to store a conversation between a requester and one or more expert wherein each party provides content in the form or audio, text and/or video.

In some embodiments, some or all responses stored in Response Log Storage 185 are available to a requester on a historical basis, e.g., the requester can review a history of responses provided to the requester and/or responses provided to other requesters. In some embodiments some or all responses stored in Response Log Storage 185 are available to experts, other than the experts that provided the responses. For example, responses may be made available to experts for the purpose of rating the responses, and/or to facilitate the use of the stored responses to respond to further customer service inquiries. In some embodiments, an expert may be rewarded (e.g., given a higher score) for providing a response that is used by other experts to resolve other customer service inquiries. In some embodiments, responses stored in Response Log Storage 185 are provided to Enterprise 130 such that Enterprise 130 can improve the knowledge base used by Contact Center 125.

In some embodiments Expert Management System 105 further comprises Automated Response Logic 190. Automated Response Logic 190 includes hardware, firmware and/or software statically stored on a computer readable medium, and configured to generate an automated response to a customer service inquiry. As used herein, an "automated response" is a response that is generated automatically by computer, e.g., without a need for real-time human input. Typically, an automated response is provided as an attempt to resolve a customer service inquiry prior to forwarding the inquiry to a human expert. For example, Routing Logic 165 may be configured to route a customer service inquiry to one of Expert Devices 115 only if the automated response does not satisfy the requester of the customer service inquiry.

The automated response is based on the topic characteristics of the inquiry and includes a pre-determined answer to the inquiry. The pre-determined answer to the inquiry optionally includes a re-purposed answer previously provided by an expert to an inquiry from a different source and/or an output of a computer based expert system included in Automated Response Logic 190. In some embodiments, an expert can modify the predetermined answer to better answer the customer service inquiry, prior to the answer being sent to the requester. In some embodiments, an automated response is sent to a requester while waiting for one or more expert to provide a manual answer. The one or more expert may modify and/or augment the automated response.

Automated Response Logic 190 is optionally used to send an automated response to customer service inquiries when a human expert is not available to respond. For example, the score of an automated response may be compared with the scores of available experts. If the score of the automated response is better than the expert scores, the automated response may be routed to the requester rather than routing the customer service inquiry to an expert. Alternatively, the automated response may be routed to the expert along with the customer service inquiry. This allows the expert to use the automated response as a basis for a manual response. The expert can provide the automated response to the requester in a modified or unmodified form. Alternatively, an automated response is provided to a requester and the inquiry is also provided to one or more experts for further response.

Responses generated by Automated Response Logic 190 are based on Automated Response Data 195. This data, stored in a non-transient computer readable medium, includes predetermined responses and rules used to determine whether a particular response is appropriate for a particular customer service inquiry, and optionally associated quality scores. In some embodiments, Automated Response Logic 190 is configured to score prospective automated responses to a customer service inquiry, the score being based on topic characteristics of the customer service inquiry, prior requester ratings and/or expert ratings of the response. Optionally, only if a minimum score is achieved will the automated response be sent to the source of the customer service inquiry. If the minimum score is not reached the inquiry is optionally just routed to one or more experts as described elsewhere herein. In response to receiving an automated response from Automated Response Logic 190, a requester may indicate that the inquiry has been satisfied or may request additional response from a human expert.

In some embodiments, responses provided by Automated Response Logic 190 are rated in manners similar to that described regarding response provided by experts, as discussed elsewhere herein. As such, an automated response can receive a score that is subsequently used to determine the automated response should be sent in response to a customer service inquiry. This score is optionally specific to one or more topic characteristics. Scores for automated responses are optionally calculated by Scoring Logic 160 using the systems and methods described elsewhere herein.

Several embodiments are specifically illustrated and/or described herein. However, it will be appreciated that modifications and variations are covered by the above teachings and within the scope of the appended claims without departing from the spirit and intended scope thereof. For example, while the examples provided herein are directed at "customer" inquiries, the disclosed systems and methods may be applied to inquiries from entities other than customers. For example, business to business service inquiries or inquiries made to government entities. Likewise, while customer service inquiries are used as an example herein, the disclosed system and methods may be applied to other types of inquiries, e.g., inquiries for support, information, actions, sales, employment, and/or service inquiries. In some embodiments service inquiries are internal to an enterprise. For example, the systems and methods described herein may enhance communication within an enterprise or enterprise social network.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data

What is claimed is:

1. An expert management system configured to manage customer service inquiries, the system comprising:
   a request I/O configured to receive a customer service inquiry;
   an inquiry parser configured to determine one or more topic characteristics of the inquiry;
   status logic configured to monitor statuses of a plurality of experts;
   expert data storage configured to store data characterizing one or more specialty characteristics of each of the plurality of experts;
   routing data storage configured to store logs of inquiry routing;
   matching logic configured to match the inquiry to a first human expert of the plurality of human experts, the matching being based on one or more expert score of the first human expert and a correlation between the topic characteristics of the inquiry and the specialty characteristics of the first human expert;
   scoring logic configured to generate the one or more expert score based on response ratings of responses provided by the first human expert; and
   routing logic configured to route the inquiry to the first human expert.

2. The system of claim 1, further comprising service interface logic configured for the first human expert to communicate with a source of the customer service inquiry.

3. The system of claim 2, wherein the service interface logic is configured for multiple human experts to communicate with the source of the customer service inquiry in parallel.

4. The system of claim 2, wherein the service interface logic is configured for a second human expert to edit and add to an answer provided by the first human expert, the answer being an answer to the customer service inquiry.

5. The system of claim 2, wherein the service interface logic is configured to display a reward for providing an answer to the customer service inquiry, the reward being specific to the customer service inquiry.

6. The system of claim 2, wherein the service interface logic is configured to display a reward for providing an answer to the customer service inquiry, and the service interface logic is configured for the reward to be specified at a source of the customer service inquiry.

7. The system of claim 1, further comprising automated response logic configured to generate an automated response to the inquiry, the automated response being based on the topic characteristics of the inquiry and including a pre-determined answer to the inquiry.

8. The system of claim 7, wherein the routing logic is configured to provide the automated response to a source of the customer service inquiry, prior to routing of the inquiry to the first human expert.

9. The system of claim 7, wherein the automated response is associated with a score, the score being specific to a topic characteristic and being based on ratings of the automated response received from experts and requesters.

10. The system of claim 1, further comprising reward logic configured to provide a reward to the first human expert as consideration for providing an answer to the customer service inquiry.

11. The system of claim 10, wherein the reward logic is configured to receive a specification of the reward from a source of the customer service inquiry.

12. The system of claim 10, wherein the reward logic is configured to determine the reward based on a pre-determined budget.

13. The system of claim 10, wherein the reward logic is configured to divide the reward between a plurality of experts.

14. The system of claim 1, further comprising response log storage configured to store responses to the customer service inquiry, the stored responses being accessible to the plurality of human experts.

15. The system of claim 1, wherein the inquiry parser is configured to determine the topic characteristics based on a source of the customer service inquiry.

16. The system of claim 1, wherein the status logic is configured to automatically scale capacity to respond to customer service inquiries by bringing additional experts online.

17. The system of claim 1, wherein the expert data storage includes identities of experts that have responded to customer service inquiries from a particular client device in the past.

18. The system of claim 1, wherein the expert data storage includes identities of experts that have been certified by a third party enterprise and also identities of experts that have not been certified.

19. The system of claim 1, wherein the routing data storage is configured to store logs of customer service inquiries that are routed to more than one human expert.

20. The system of claim 1, wherein the routing data storage is configured to store logs of customer service inquiries that were first routed to a human expert and then routed to a contact center of an enterprise.

21. The system of claim 1, wherein the matching logic is further configured to match the customer service inquiry to a team of experts, the team including the first human expert.

22. The system of claim 1, wherein the matching logic is further configured to match the customer service inquiry to a plurality of experts based on a plurality of topic characteristics in the customer service inquiry, the plurality of experts including the first human expert and including experts having complementary specialties.

23. The system of claim 1, wherein the matching logic is further configured to match the customer service inquiry based on previous service provided by the first human expert.

24. The system of claim 1, wherein the routing logic is configured to send the customer service inquiry to multiple human experts in parallel.

25. The system of claim 1, wherein the routing logic is configure to automatically send the customer service inquiry to a second human expert, if the first human expert is unable to provide an adequate answer to the customer service inquiry.

26. The system of claim 1, wherein the routing logic is configured to send the customer service inquiry to a second human expert in parallel with the first human expert.

27. The system of claim 26, wherein scoring logic configured is configure to score the first and second human experts based on a collaborative response to the customer service inquiry.

* * * * *